(12) United States Patent
Hashimoto et al.

(10) Patent No.: US 6,500,083 B2
(45) Date of Patent: Dec. 31, 2002

(54) AUTOMATIC TRANSMISSION

(75) Inventors: Naoya Hashimoto, Tokyo (JP); Teruo Miyaoku, Tokyo (JP); Shiro Hasegawa, Tokyo (JP); Chiaki Sugano, Tokyo (JP); Hiromasa Ozawa, Tokyo (JP); Hirohisa Ohta, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 71 days.

(21) Appl. No.: 09/848,340

(22) Filed: May 4, 2001

(65) Prior Publication Data

US 2002/0052263 A1 May 2, 2002

(30) Foreign Application Priority Data

Oct. 30, 2000 (JP) ........................................ 2000-330751

(51) Int. Cl.[7] ............................................... F16H 59/00
(52) U.S. Cl. .......................... 474/18; 474/28; 74/606 A
(58) Field of Search ........................ 475/161; 74/606 R, 74/606 A; 474/18, 28

(56) References Cited

U.S. PATENT DOCUMENTS 4,916,982 A * 4/1990 Suzuki ........................ 474/28
5,997,431 A * 12/1999 Vukovich et al. ............. 474/28

FOREIGN PATENT DOCUMENTS

JP  5-276710  10/1993  ............ H02K/7/06

OTHER PUBLICATIONS

English language Abstract. JP 5–276710. Oct. 22, 1993.

* cited by examiner

Primary Examiner—Dirk Wright
(74) Attorney, Agent, or Firm—Sughrue Mion, PLLC

(57) ABSTRACT

An automatic transmission includes a transmission case containing oil, a transmission structure housed in the transmission case, for varying the ratio of rotational speeds between a driving shaft connected to wheels and an engine shaft connected to an engine, a transmission control valve housed in the transmission case, for controlling the transmission structure, and a motor as a driving source for driving the transmission control valve. The motor includes a cover, a motor body having a coil disposed under the cover and formed with a wound conductor, a shaft rotated by an electrical current applied to the coil, and a converting structure for converting the rotational movement of the shaft into linear movement. The motor is fixed to the transmission case so that the motor body is disposed in air.

8 Claims, 7 Drawing Sheets

AUTOMATIC TRANSMISSION

BACKGROUND OF THE INVENTION

1. Field of the Invention

The present invention relates to automatic transmissions such as continuously variable transmissions for automotive vehicles.

2. Description of the Related Art

FIG. 4 shows a known continuously variable transmission for a motor vehicle. The known continuously variable transmission includes a stepping motor 1 having a reciprocating rod 16, a first link 100 connected to the reciprocating rod 16, a second link 101 connected to the first link 100, and a transmission control valve 102 connected to the second link 101 at an intermediate part thereof. The known continuously variable transmission also includes a first pulley 103 connected to the second link 101 at an end of the second link 101 and to an engine 107 via an engine shaft 106, a second pulley 105 connected to the first pulley 103 via a metallic belt 104 and to a wheel 109 via a driving shaft 108, and a hydraulic servo structure for driving the transmission control valve 102.

The hydraulic servo structure includes an oil pump 110, an oil pan 111, a controller 112 for controlling the transmission control valve 102 and the like so that the driving shaft 108 and the engine shaft 106 rotate at a predetermined ratio of rotational speeds between each other, and a speed sensor 113 for determining the rotation of the first pulley 103 and the second pulley 105, respectively.

A transmission structure for controlling the ratio of rotational speeds between the driving shaft 108 and the engine shaft 106 is formed with the first pulley 103, the second pulley 105, and the metallic belt 104.

In the continuously variable transmission, the rod 16 is reciprocated by the rotation of the stepping motor 1, thereby opening and closing the transmission control valve 102 via the first and second links 100 and 101, whereby an operating oil for the first pulley 103 is supplied and discharged through the transmission control valve 102. The second link 101 pivots on a supporting point A.

The operating oil from the transmission control valve 102 moves a drum 103a of the first pulley 103, thereby varying the ratio of the diameters between the first and second pulleys 103 and 105 on which the metallic belt 104 is mounted, and controlling the ratio of the rotational speeds of the driving shaft 108 and the engine shaft 106.

FIG. 5 is a plan view of the stepping motor 1 shown in FIG. 4. FIG. 6 is a sectional view of the stepping motor 1 shown in FIG. 5 along a line VI—VI. FIG. 7 is a sectional view of the stepping motor 1 shown in FIG. 6 along a line VII—VII. FIG. 8 is a sectional view of the stepping motor 1 shown in FIG. 6 along a line VIII—VIII. FIG. 9 is a perspective view of a critical portion of the stepping motor 1 shown in FIG. 4.

In the drawings, the permanent-magnet-type stepping motor 1 includes a resin casing 2, a resin cylindrical housing 12 connected with the casing 2, a motor body 3 housed in the casing 2, a shaft 4 to be rotated by the motor body 3, and a converting structure 31 for converting the rotational movement of the shaft 4 into linear movement. The cover is composed of the casing 2 and the housing 12.

The motor body 3 includes a stator 5 fixed to the casing 2, and a rotor 6 fixed to the shaft 4. The stator 5 includes a coil 7 having a conductor made of a copper wire covered with an insulative film which is wound in a plurality of turns, coil terminals 8 led out from the coil 7, connector terminals 9 connected to the coil terminals 8, and external terminals 25 connected to the connector terminals 9. The rotor 6 includes a bush 10 fixed to the shaft 4, and a hollow cylindrical permanent-magnet 11 fixed to the bush 10.

The housing 12 is fixed at a first end thereof to the casing 2 by a plurality of screws 12A extending parallel to the shaft 4. The casing 2 is provided with a circular mating hole 2a formed therein, and the housing 12 is provided with a mating member 12a so as to be inserted in the mating hole 2a. In FIG. 7, the mating member 12a is provided with three positioning-protrusions 12b at the outer periphery of the mating member 12a, the positioning protrusions 12b protruding in the radial directions and in contact with the inner periphery of the mating hole 2a. The housing 12 is provided with an annular groove 12c formed therein at a face in connection with the casing 2.

The housing 12 is provided therein with a housing through-hole 12d communicating between the outside and the inside of the housing 12, the housing through-hole 12d being provided at a side face of the housing 12. A filter 13 for capturing contamination of oil is provided in the housing through-hole 12d. The shaft 4 is rotatably supported by bearings 14 and 15. The bearing 15 affixed in the housing 15 is a rubber-seal-type bearing.

The housing 12 is provided, at a second end thereof opposite to the first end fixed to the casing 2, with a rod 16 which reciprocates along the axis of the shaft 4 with the rotation of the shaft 4. The rod 16 is inserted into the housing 12 at the base end of the rod 16, and the other end of the rod 16 protrudes from the second end of the housing 12. The rod 16 is provided therein with a through-hole 16a communicating between the inside of the housing 12 and the inside of the rod 16. The housing 12 is provided at the inner face of the second end thereof with a sleeve 17 for guiding the rod 16 linearly moving, an oil seal 18 for avoiding contamination to penetrate from the outer periphery of the rod 16, and an annular stopper 19 for restricting the linear movement of the rod 16.

The converting structure 31 includes a threaded part 4a of the shaft 4, a resin guide member 20 disposed at the base end of the rod 16 and coupled with the threaded part 4a, and a metallic stopper 21 for restricting the linear movement of the rod 16 at the other side of the annular stopper 19. The guide member 20 and the stopper 21 include stopper faces 20b and 21a, respectively, perpendicular to the rotational axis of the shaft 4. In FIG. 8, the guide member 20 is provided with rotation-restricting protrusions 20a for restricting rotation of the rod 16 formed extending in the radial directions at the outer periphery of the guide member 20. With this arrangement, the guide member 20 is moved in the axial direction of the shaft 4 by the rotation thereof. The rod 16 is mounted with a resin member 22 to be coupled with the first link 100 at the end opposite to the base end of the rod 16.

In the stepping motor 1 having the above-described configuration, when electrical current is applied to the coil 7 via the connectors 25, a rotation-driving magnetic field is generated in the coil 7, thereby rotating the rotor 6 and the shaft 4 as a unit. The shaft 4 is coupled with the guide member 20 at the threaded part 4a of the shaft 4, and the rotational movement of the guide member 20 is restricted, whereby the rotational movement of the shaft 4 is converted into the linear movement of the guide member 20 and the rod 16.

By the linear movement of the rod 16 in both directions, the transmission control valve 102 is opened and closed via the first and second links 100 and 101, whereby the ratio of rotational speeds between the driving shaft 108 and the engine shaft 106 varies, as described above.

In the known continuously variable transmission, the stepping motor 1 is dipped in oil containing sulfur and organic sulfur compounds. Therefore, sulfur and the like transmit through an insulative film of a conductor included in the coil 7, and a sulfur compound is produced so as to be disposed between a copper wire and the insulative film by the chemical reaction between the copper wire and the sulfur, whereby the adhesion between the insulative film and the copper wire is reduced. In this case, there is a risk in that the insulative film is damaged by friction of the adjacent copper wires with each other caused by repeated thermal expansion and contraction due to a thermal hysteresis of the copper wires, whereby copper dissolves due to the potential gradient between the adjacent copper wires, thereby causing short circuits or, sometimes disconnection. Particularly, the insulative film is more likely to be damaged at a position in which the conductor and a bobbin is in contact with each other which have thermal expansion coefficients differing from each other, whereby there is a greater risk of short circuits and disconnection.

Moreover, when the temperature in the oil is increased by the heat from the coil 7 to a level higher than the vaporization temperature of volatile components, sulfur and the like are more likely to transmit through the insulative film and to cause short circuits between the wires.

SUMMARY OF THE INVENTION

Accordingly, it is an object of the present invention to provide an automatic transmission including a motor in which the risk of short circuits and disconnection of conductors is significantly reduced.

To this end, according to a first aspect of the present invention, an automatic transmission comprises a transmission case containing oil; a transmission structure housed in the transmission case, for varying the ratio of rotational speeds between a driving shaft connected to wheels and an engine shaft connected to an engine; a transmission control valve housed in the transmission case, for controlling the transmission structure; and a motor as a driving source for driving the transmission control valve. The motor includes a cover, a motor body having a coil disposed under the cover and formed with a wound conductor, a shaft rotated by an electrical current applied to the coil, and a converting structure for converting the rotational movement of the shaft into linear movement. The motor is fixed to the transmission case so that the motor body is disposed in air.

A smaller case which houses the motor body therein may be provided in the transmission case so as to communicate with the air.

The cover may include a casing for housing the motor body and a housing connected to the casing, and a shoulder part of the housing may be in contact with the transmission case at the periphery of a connecting hole formed in the transmission case.

The cover may include a casing for housing the motor body and a housing connected to the casing, and a shoulder part of the housing may be in contact with the smaller case at the periphery of a connecting hole formed in the smaller case.

According to a second aspect of the present invention, an automatic transmission comprises a transmission case containing oil; a transmission structure housed in the transmission case, for varying the ratio of rotational speeds between a driving shaft connected to wheels and an engine shaft connected to an engine; a transmission control valve housed in the transmission case, for controlling the transmission structure; and a motor as a driving source for driving the transmission control valve. The motor includes a cover, a motor body having a coil disposed under the cover and formed with a wound conductor, a shaft rotated by an electrical current applied to the coil, a converting structure for converting the rotational movement of the shaft into linear movement, and a heat-releasing plate in contact with the motor body at the periphery thereof and provided with a corrugated part formed on a surface of the heat-releasing plate.

According to a third aspect of the present invention, an automatic transmission comprises a transmission case containing oil; a transmission structure housed in the transmission case, for varying the ratio of rotational speeds between a driving shaft connected to wheels and an engine shaft connected to an engine; a transmission control valve housed in the transmission case, for controlling the transmission structure; and a motor as a driving source for driving the transmission control valve. The motor includes a cover, a motor body having a coil disposed under the cover and formed with a wound conductor, a shaft rotated by an electrical current applied to the coil, and a converting structure for converting the rotational movement of the shaft into linear movement. The value of the electrical current applied to the coil and the number of winding turns of the conductor are set so that the temperature in the oil is below the vaporization temperature of the oil.

The motor may further include a heat-releasing plate in contact with the motor body at the periphery thereof and provided with a corrugated part formed on a surface of the heat-releasing plate.

The motor may be a stepping motor.

DESCRIPTION OF THE PREFERRED EMBODIMENTS

Figure 1:
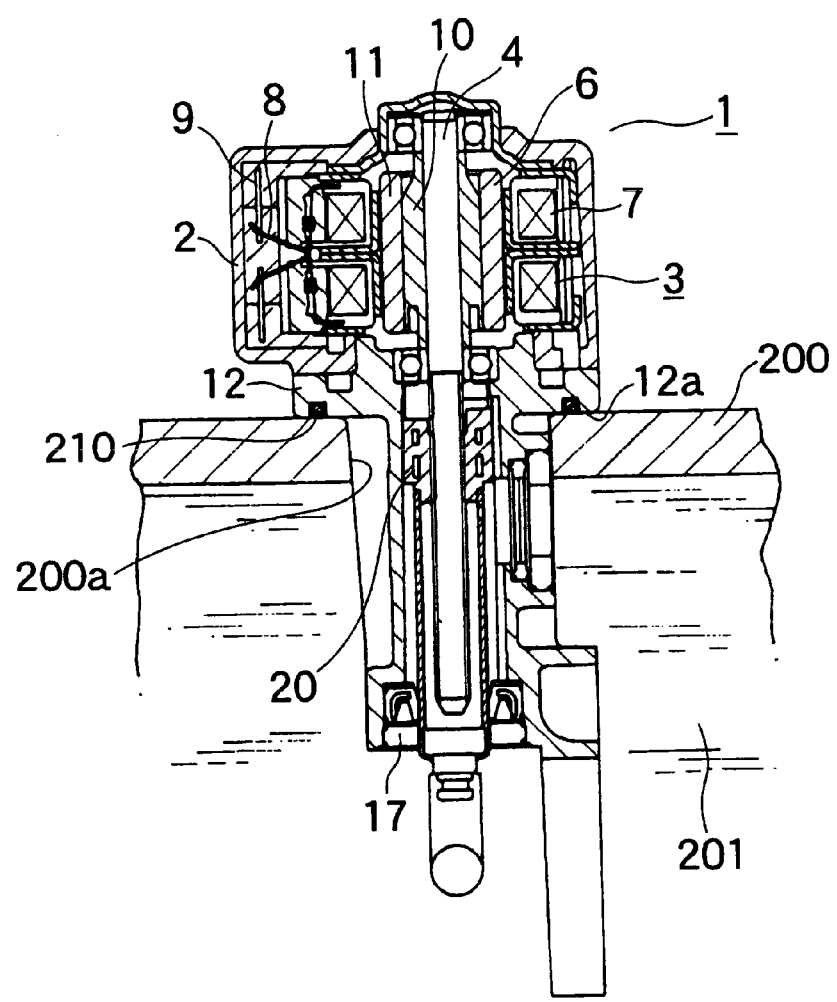
FIG. 1 is a sectional view of a critical portion of a continuously variable transmission according to a first embodiment of the present invention.

Embodiments according to the present invention are described below with reference to the drawings. Components the same as and corresponding to those used in the known stepping motor are referred to with the same reference numerals, for which description is omitted.

(First Embodiment)

FIG. 1 is a sectional view of a critical portion of a continuously variable transmission according to a first embodiment of the present invention. A stepping motor 1 to be used in the continuously variable transmission is mounted to a transmission case 200 containing oil 201 in a manner such that a housing 12 of the stepping motor 1 is brought into contact with the periphery of a connecting hole 200a of the transmission case 200 at a shoulder part 12a of the housing 12. A motor body 3 is exposed outside. An elastic ring 210 is disposed in a groove formed in the shoulder part 12a, which prevents the oil 201 in the transmission case 200 from leaking.

According to the first embodiment, the motor body 3 of the stepping motor 1 is exposed outside; therefore, the coil is not dipped in the oil 201 containing sulfur and organic sulfur compounds. Therefore, short circuits or disconnection in the coil 7 is avoided, which might occur when dipped in the oil 201, whereby a stepping motor, in which a risk of short circuits and disconnection is reduced, is provided.

(Second Embodiment)

Figure 2:
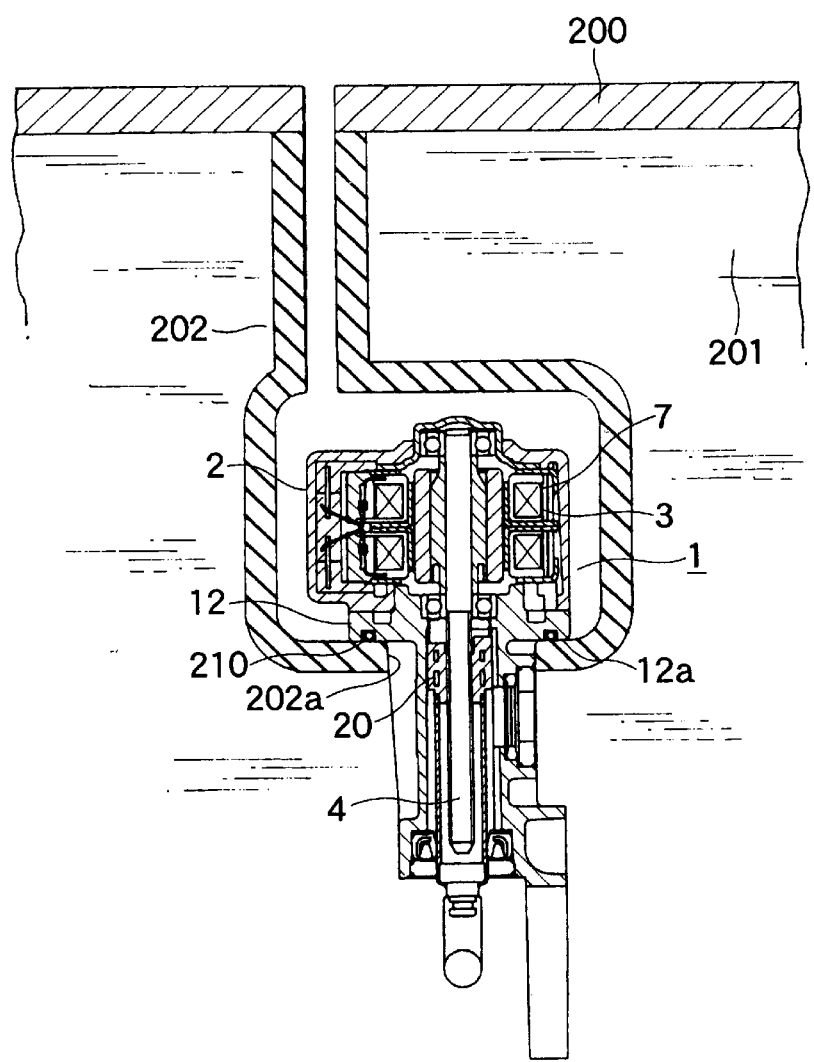
FIG. 2 is a sectional view of a critical portion of a continuously variable transmission according to a second embodiment of the present invention.

FIG. 2 is a sectional view of a critical portion of a continuously variable transmission according to a second embodiment of the present invention. A stepping motor 1 to be used in the continuously variable transmission is mounted to a transmission case 200 containing oil 201 in a manner such that a housing 12 of the stepping motor 1 is brought into contact with the periphery of a connecting hole 202a of a smaller case 202 disposed in the transmission case 200 at a shoulder part 12a of the housing 12. The smaller case 202 communicates with the outside of the transmission case 200, whereby a motor body 3 is disposed in air. An elastic ring 210 is disposed in a groove formed in the shoulder part 12a, which prevents the oil 201 in the transmission case 200 from leaking.

According to the second embodiment, the oil 201 is not entered in the smaller case 202, whereby a coil 7 is not dipped in the oil 201. Therefore, short circuits and disconnection can be avoided, thereby providing a stepping motor in which the risk of short circuits and disconnection is reduced.

Since the stepping motor 1 is disposed inside the transmission case 200, various components can be mounted on the transmission case at the outside thereof without interference with the stepping motor 1.

(Third Embodiment)

Figure 3:
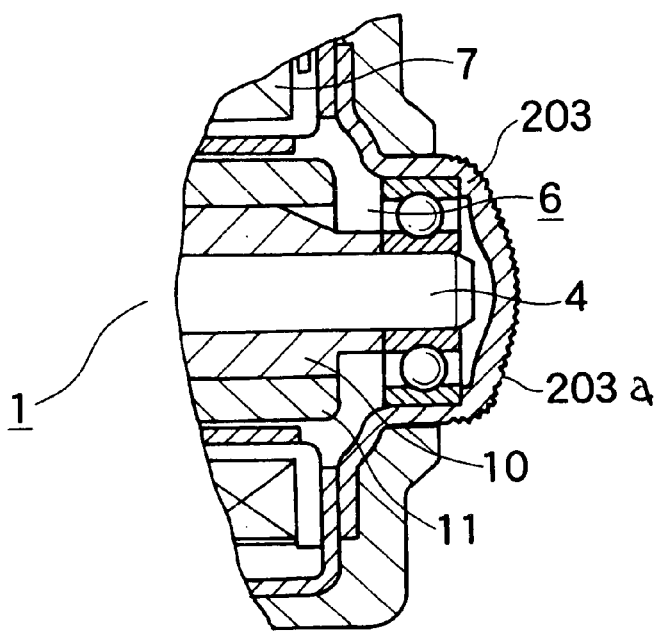
FIG. 3 is a sectional view of a critical portion of a continuously variable transmission according to a third embodiment of the present invention.
Figure 4:
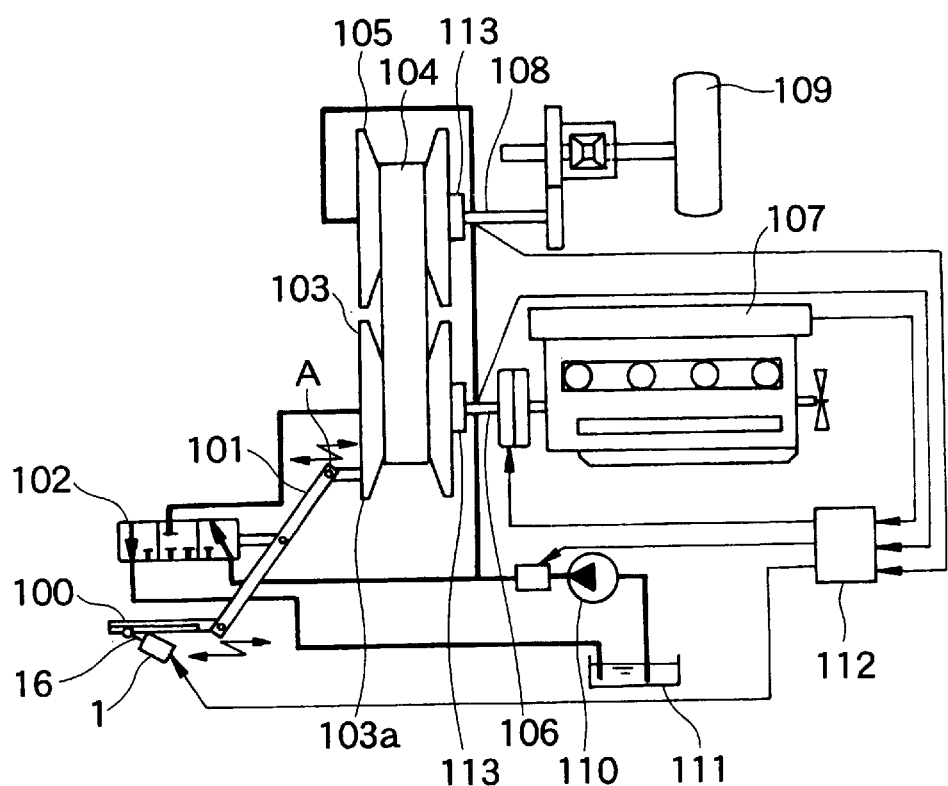
FIG. 4 is an illustration of the continuously variable transmission.
Figure 5:
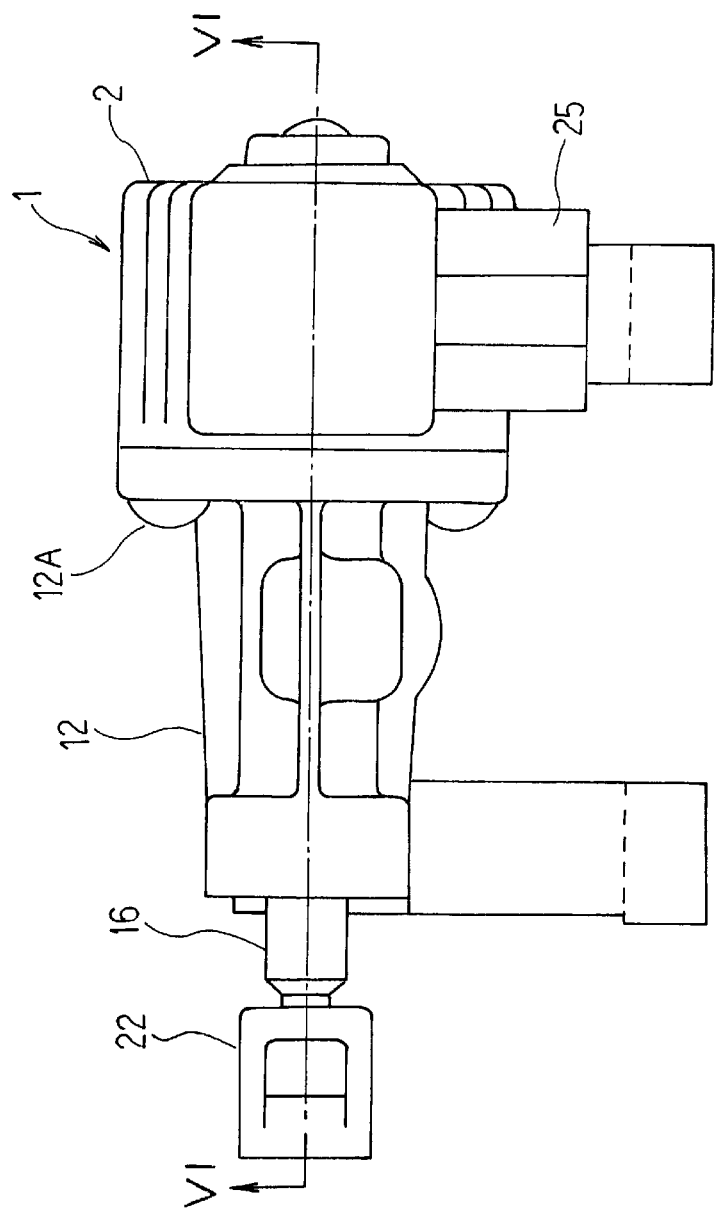
FIG. 5 is a plan view of a known stepping motor.
Figure 6:
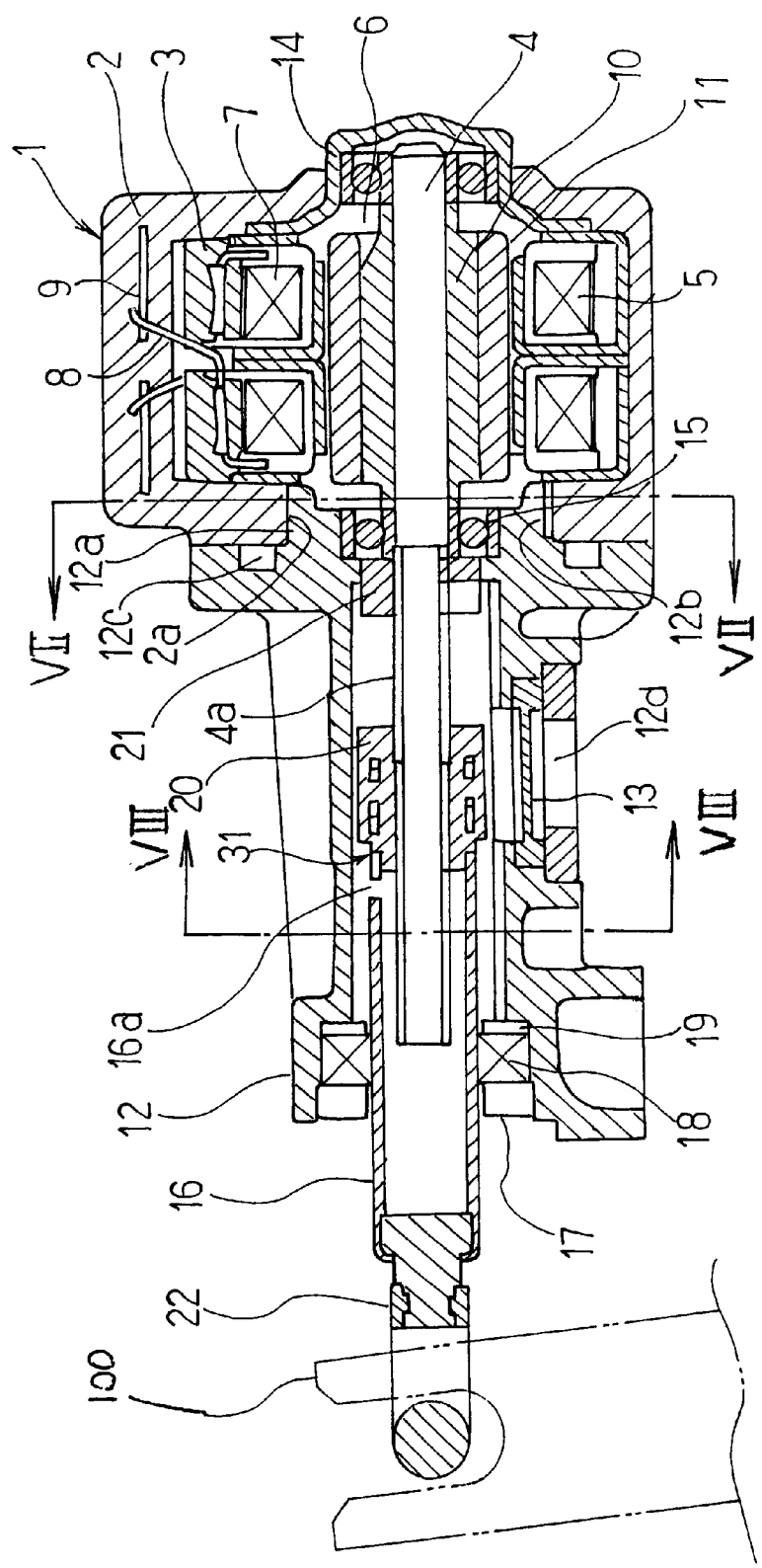
FIG. 6 is a sectional view of the known stepping motor shown in FIG. 5 along a line VI—VI.
Figure 7:
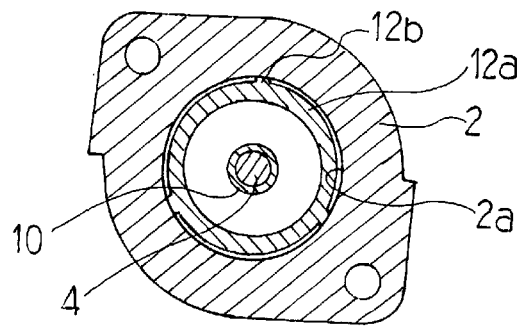
FIG. 7 is a sectional view of the known stepping motor shown in FIG. 6 along a line VII—VII.
Figure 8:
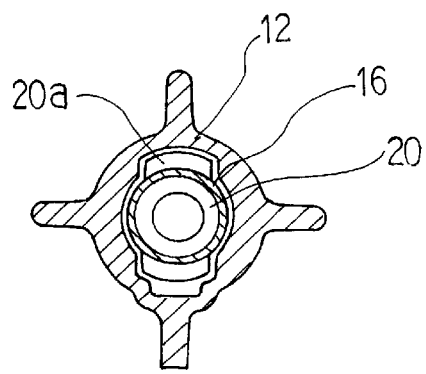
FIG. 8 is a sectional view of the known stepping motor shown in FIG. 6 along a line VIII—VIII.
Figure 9:
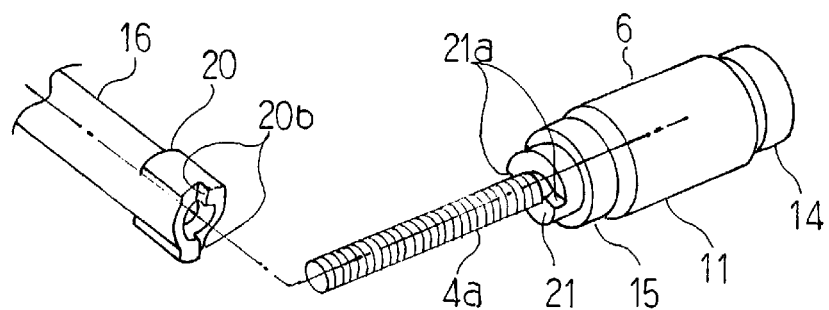
FIG. 9 is a perspective view of a critical portion of the known stepping motor shown in FIG. 6.

FIG. 3 is a sectional view of a critical portion of a continuously variable transmission according to a third embodiment of the present invention. A stepping motor 1 to be used in the continuously variable transmission is dipped in oil 201 contained in a transmission case 200. A heat-releasing plate 203 is fixed to a casing 2 of the stepping motor 1 at an end opposite to the end to which a housing 12 is fixed, the heat-releasing plate 203 being in contact with a rotor 6 at the periphery of the heat-releasing plate 203. The heat-releasing plate 203, which is made of aluminum, is provided with a corrugated part 203a at the outer surface thereof.

According to the third embodiment, the heat-releasing plate 203 is provided with the corrugated part 203a at the outer surface thereof, thereby increasing the area of the oil 201 in contact with the heat-releasing plate 203 which releases the heat of the oil 201 received from a coil 7. The temperature in the oil 201 in the coil 7 can be easily decreased to a level lower than the vaporization temperature of volatile components, thereby avoiding short circuits and disconnection due to the volatile components in the oil 201, whereby the risk of short circuits and disconnection can be reduced.

The current applied to the coil 7 may be reduced so as to reduce the heat generated in the coil 7 in order to suppress the temperature in the oil 201 below the vaporization temperature. In this case, winding turns of a conductor must be increased so that the reciprocating force of the shaft 4 is maintained.

Although according to the first to third embodiments, the stepping motor 1 is used, the present invention is not limited to a stepping motor. The transmission according to the present invention is not limited to a continuously variable transmission.

As described above, in the automatic transmission according to the present invention, an automatic transmission comprises a transmission case containing oil; a transmission structure housed in the transmission case, for varying the ratio of rotational speeds between a driving shaft connected to wheels and an engine shaft connected to an engine; a transmission control valve housed in the transmission case, for controlling the transmission structure; and a motor as a driving source for driving the transmission control valve. The motor includes a cover, a motor body having a coil disposed under the cover and formed with a wound conductor, a shaft rotated by an electrical current applied to the coil, and a converting structure for converting the rotational movement of the shaft into linear movement. The motor is fixed to the transmission case so that the motor body is disposed in air. Therefore, the coil is not dipped in oil containing sulfur and organic sulfur compounds, short circuits and disconnection of conductors can be avoided, whereby the risk of short circuits and disconnection can be reduced.

According to one form of the automatic transmission, a smaller case which houses the motor body therein may be provided in the transmission case so as to communicate with the air. Therefore, various components can be mounted on a transmission case at the outside thereof without interference with a motor.

According to another form of the automatic transmission, the cover may include a casing for housing the motor body and a housing connected to the casing, and a shoulder part of the housing may be in contact with the transmission case at the periphery of a connecting hole formed in the transmission case. Therefore, the motor can be easily and firmly mounted on the transmission.

According to still another form of the automatic transmission, the cover may include a casing for housing the motor body and a housing connected to the casing, and a shoulder part of the housing may be in contact with the smaller case at the periphery of a connecting hole formed in the smaller case. Therefore, the motor can be also mounted easily and firmly on the smaller case.

According to a second aspect of the present invention, an automatic transmission comprises a transmission case containing oil; a transmission structure housed in the transmission case, for varying the ratio of rotational speeds between a driving shaft connected to wheels and an engine shaft connected to an engine; a transmission control valve housed in the transmission case, for controlling the transmission structure; and a motor as a driving source for driving the transmission control valve. The motor includes a cover, a motor body having a coil disposed under the cover and formed with a wound conductor, a shaft rotated by an electrical current applied to the coil, a converting structure for converting the rotational movement of the shaft into linear movement, and a heat-releasing plate in contact with the motor body at the periphery thereof and provided with a corrugated part formed on a surface of the heat-releasing plate. Therefore, the area of oil in contact with a heat-releasing plate is increased, the heat from the coil is released to the outside via the heat-releasing plate. Thus, the temperature of the oil in the position of the coil can be easily decreased to a level lower than the vaporization temperature of volatile components, thereby avoiding short circuits and disconnection due to the volatile components in the oil, whereby the risk of short circuits and disconnection can be reduced.

According to a third aspect of the present invention, an automatic transmission comprises a transmission case containing oil; a transmission structure housed in the transmission case, for varying the ratio of rotational speeds between a driving shaft connected to wheels and an engine shaft connected to an engine; a transmission control valve housed in the transmission case, for controlling the transmission structure; and a motor as a driving source for driving the transmission control valve. The motor includes a cover, a motor body having a coil disposed under the cover and formed with a wound conductor, a shaft rotated by an electrical current applied to the coil, and a converting structure for converting the rotational movement of the shaft into linear movement. The value of the electrical current applied to the coil and the number of winding turns of the conductor are set so that the temperature in the oil is below the vaporization temperature of the oil. Therefore, the same advantage as described in the second aspect of the present invention above can be offered.

According to another form of the automatic transmission, the motor may further include a heat-releasing plate in contact with the motor body at the periphery thereof and provided with a corrugated part formed on a surface of the heat-releasing plate. Therefore, the temperature in the oil in the transmission case can be easily reduced to a level below the evaporating temperature of the oil.

According to still another form of the automatic transmission, the motor may be a stepping motor. Therefore, the position of a reciprocating shaft can be easily controlled, whereby the speed can reliably be varied.

What is claimed is:

1. An automatic transmission comprising:
   a transmission case containing oil;
   a transmission structure housed in the transmission case, for varying the ratio of rotational speeds between a driving shaft connected to wheels and an engine shaft connected to an engine;
   a transmission control valve housed in the transmission case, for controlling the transmission structure; and
   a motor as a driving source for driving the transmission control valve, the motor including a cover, a motor body having a coil disposed under the cover and formed with a wound conductor, a shaft rotated by an electrical current applied to the coil, and a converting structure for converting the rotational movement of the shaft into linear movement, the motor being fixed to the transmission case so that the motor body is disposed in air.

2. An automatic transmission according to claim 1, wherein a smaller case which houses the motor body therein is provided in the transmission case so as to communicate with the air.

3. An automatic transmission according to claim 1, wherein the cover includes a casing for housing the motor body and a housing connected to the casing, and a shoulder part of the housing is in contact with the transmission case at the periphery of a connecting hole formed in the transmission case.

4. An automatic transmission according to claim 2, wherein the cover includes a casing for housing the motor body and a housing connected to the casing, and a shoulder part of the housing is in contact with the smaller case at the periphery of a connecting hole formed in the smaller case.

5. An automatic transmission comprising:
   a transmission case containing oil;
   a transmission structure housed in the transmission case, for varying the ratio of rotational speeds between a driving shaft connected to wheels and an engine shaft connected to an engine;
   a transmission control valve housed in the transmission case, for controlling the transmission structure; and
   a motor as a driving source for driving the transmission control valve, the motor including a cover, a motor body having a coil disposed under the cover and formed with a wound conductor, a shaft rotated by an electrical current applied to the coil, a converting structure for converting the rotational movement of the shaft into linear movement, and a heat-releasing plate in contact with the motor body at the periphery thereof and provided with a corrugated part formed on a surface of the heat-releasing plate.

6. An automatic transmission comprising:
   a transmission case containing oil;
   a transmission structure housed in the transmission case, for varying the ratio of rotational speeds between a driving shaft connected to wheels and an engine shaft connected to an engine;
   a transmission control valve housed in the transmission case, for controlling the transmission structure; and
   a motor as a driving source for driving the transmission control valve, the motor including a cover, a motor body having a coil disposed under the cover and formed with a wound conductor, a shaft rotated by an electrical current applied to the coil, and a converting structure for converting the rotational movement of the shaft into linear movement,
   wherein the value of the electrical current applied to the coil and the number of winding turns of the conductor are set so that the temperature of the oil is below the vaporization temperature of the oil.

7. An automatic transmission according to claim 6, wherein the motor further includes a heat-releasing plate in contact with the motor body at the periphery thereof and provided with a corrugated part formed on a surface of the heat-releasing plate.

8. An automatic transmission according to claim 1, wherein the motor is a stepping motor.

* * * * *